United States Patent
Sen et al.

(10) Patent No.: US 10,489,496 B1
(45) Date of Patent: Nov. 26, 2019

(54) SYSTEMS AND METHODS FOR ADVERTISING WITHIN A SUBTITLE OF A MEDIA ASSET

(71) Applicant: Rovi Guides, Inc., San Jose, CA (US)

(72) Inventors: Susanto Sen, Bangalore (IN); Gyanveer Singh, Bihar (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/121,218

(22) Filed: Sep. 4, 2018

(51) Int. Cl.
| | |
|---|---|
| H04N 7/10 | (2006.01) |
| H04N 7/025 | (2006.01) |
| G06F 17/22 | (2006.01) |
| H04N 21/41 | (2011.01) |
| G06Q 30/02 | (2012.01) |
| H04N 21/45 | (2011.01) |
| H04N 21/488 | (2011.01) |

(52) U.S. Cl.
CPC ..... *G06F 17/2258* (2013.01); *G06Q 30/0244* (2013.01); *H04N 21/4122* (2013.01); *H04N 21/4532* (2013.01); *H04N 21/4882* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,266,094 B1 * | 7/2001 | Taylor, Jr. ............ | H04N 7/0885 348/465 |
| 6,337,947 B1 * | 1/2002 | Porter ................... | H04N 7/163 348/E5.006 |
| 6,564,378 B1 | 5/2003 | Satterfield et al. | |
| 7,139,031 B1 * | 11/2006 | Bray .................. | H04N 5/23241 348/468 |
| 7,165,098 B1 | 1/2007 | Boyer et al. | |
| 7,518,657 B2 * | 4/2009 | Mitts .................... | H04N 7/0885 348/465 |
| 7,761,892 B2 | 7/2010 | Ellis et al. | |
| 8,046,801 B2 | 10/2011 | Ellis et al. | |
| 8,582,565 B1 * | 11/2013 | Morsy .................... | H04L 67/02 348/14.04 |
| 8,736,761 B2 * | 5/2014 | Kendall ............. | H04N 5/44513 348/473 |
| 9,510,044 B1 * | 11/2016 | Pereira ............. | H04N 21/44008 |
| 9,681,165 B1 | 6/2017 | Gupta et al. | |
| 2002/0007371 A1 * | 1/2002 | Bray .................. | H04N 5/44513 715/205 |
| 2002/0174430 A1 | 11/2002 | Ellis et al. | |
| 2004/0117819 A1 * | 6/2004 | Yu ....................... | H04N 5/44504 725/32 |
| 2005/0251827 A1 | 11/2005 | Ellis et al. | |

(Continued)

Primary Examiner — William J Kim
(74) Attorney, Agent, or Firm — Haley Guiliano LLP

(57) ABSTRACT

Systems and methods are disclosed herein for inserting an advertisement into a subtitle of a media asset for display as part of the subtitle of the media asset. By identifying text, which relates to products, mentioned in the subtitles of program annotations of a media asset, advertisement phrases can be associated with the specific text of the subtitle. Such advertisement phrases can then be inserted into the subtitles for display as part of the subtitle of the media asset. As users generally pay attention to the subtitle when watching a media asset, an advertisement displayed as part of the subtitle of the media asset can reach a user in an inexpensive and efficient way.

20 Claims, 10 Drawing Sheets

(56) References Cited

U.S. PATENT DOCUMENTS

| | | | |
|---|---|---|---|
| 2006/0013563 A1 | 1/2006 | Adolph et al. | |
| 2006/0123451 A1* | 6/2006 | Preisman | H04N 7/17318 725/86 |
| 2007/0160344 A1* | 7/2007 | McCrossan | G11B 27/034 386/241 |
| 2007/0300261 A1* | 12/2007 | Barton | G06Q 30/0241 725/58 |
| 2008/0085099 A1* | 4/2008 | Guihot | G11B 27/10 386/201 |
| 2008/0244638 A1 | 10/2008 | Ryden | |
| 2008/0284910 A1* | 11/2008 | Erskine | G11B 27/11 348/468 |
| 2010/0153885 A1 | 6/2010 | Yates | |
| 2010/0175082 A1* | 7/2010 | Blumenschein | G06Q 30/02 725/32 |
| 2011/0093882 A1* | 4/2011 | Candelore | H04N 7/163 725/28 |
| 2011/0110646 A1* | 5/2011 | Smith | H04H 20/31 386/241 |
| 2011/0149153 A1* | 6/2011 | Nam | H04N 21/4307 348/468 |
| 2011/0179445 A1* | 7/2011 | Brown | G06Q 30/02 725/32 |
| 2012/0054619 A1* | 3/2012 | Spooner | G11B 27/034 715/723 |
| 2012/0059954 A1* | 3/2012 | Gilson | H04N 21/234381 709/246 |
| 2012/0124232 A1* | 5/2012 | Kim | H04N 21/2343 709/231 |
| 2013/0071090 A1* | 3/2013 | Berkowitz | H04N 9/7921 386/248 |
| 2014/0115625 A1* | 4/2014 | McCoy | H04N 21/23424 725/34 |
| 2014/0122232 A1* | 5/2014 | Press | G06Q 30/0256 705/14.54 |
| 2014/0136186 A1* | 5/2014 | Adami | G06F 17/2264 704/9 |
| 2014/0181862 A1* | 6/2014 | Sussman | H04N 21/4126 725/35 |
| 2014/0337126 A1* | 11/2014 | Ohanyan | G06Q 30/0251 705/14.49 |
| 2014/0337308 A1* | 11/2014 | De Francisci Morales | H04N 21/23418 707/708 |
| 2015/0098018 A1* | 4/2015 | Starling | H04N 7/0882 348/468 |
| 2015/0189350 A1* | 7/2015 | Jo | H04N 21/812 725/32 |
| 2015/0248919 A1* | 9/2015 | Homma | G06F 3/0488 386/243 |
| 2016/0088353 A1* | 3/2016 | Kim | H04N 21/25891 725/10 |
| 2016/0357746 A1* | 12/2016 | Koul | G10L 15/183 |
| 2017/0272818 A1* | 9/2017 | Gattis | H04N 21/45452 |
| 2018/0199111 A1* | 7/2018 | Chou | H04N 21/4316 |

* cited by examiner

301

00:22:33,699 --> 00:22:36,321
He's not from around here.
00:22:36,786 --> 00:22:38,862
There's a lot we'll have to bring you up to speed on
00:22:41,124 --> 00:22:43,164
The world has gotten even stranger
00:22:43,293 --> 00:22:44,372
than you already know.
00:22:44,878 --> 00:22:47,452
At this point, I doubt anything would surprise me.
00:22:48,089 --> 00:22:49,749 Ten bucks says you're wrong.
...
00:22:53,011 --> 00:22:55,383
waiting for you back at your apartment.
...
00:23:01,311 --> 00:23:03,600
You should have left it in the bag.

302

00:22:33,699 --> 00:22:36,321
He's not from around here.
00:22:36,786 --> 00:22:38,862
There's a lot we'll have to bring you up to speed on WITH GOODYEAR TYRES
00:22:41,124 --> 00:22:43,164
The world has gotten even stranger
00:22:43,293 --> 00:22:44,372
than you already know.
00:22:44,878 --> 00:22:47,452
At this point, I doubt anything would surprise me LIKE TIVO.
00:22:48,089 --> 00:22:49,749
Ten bucks says you're wrong.
...
00:22:53,011 --> 00:22:55,383
waiting for you back at your CHRISTIE'S apartment.
...
00:23:01,311 --> 00:23:03,600
You should have left it in the CAPRESE bag.

FIG. 3

SYSTEMS AND METHODS FOR ADVERTISING WITHIN A SUBTITLE OF A MEDIA ASSET

BACKGROUND

Television advertisement has been used to promote products among the television audience. For example, when users are watching a media asset streamed from a television channel, advertisements are displayed during commercial breaks. For another example, some existing systems insert product placement advertisement into the content of the media asset, e.g., a brand name product may be featured in a scene of a television show. To get an advertisement of a target product displayed during the commercial break, the advertiser often needs to spend resource to produce a video advertisement for display during the commercial break. However, the advertisement reach during commercial break can be unstable as audience members may not pay attention to the content displayed during commercial breaks and may even choose to switch channels at commercial breaks. Thus, commercial break advertising may not be cost-effective as it often fails to attract the attention of the audience.

SUMMARY

Systems and methods are disclosed herein for improving advertisement reach over conventional commercial advertising by inserting an advertisement into a subtitle of a media asset for display as part of the subtitle of the media asset. In order to provide this improvement, a media guidance application identifies text, which relates to products, mentioned in the subtitles of program annotations of a media asset, and selects advertisement phrases associated with that specific text. Such advertisement phrases can then be inserted into the subtitles for display as part of the subtitle of the media asset. As users generally pay attention to the subtitle when watching a media asset, an advertisement displayed as part of the subtitle of the media asset by the media guidance application can reach a user in an inexpensive and efficient way.

Specifically, a media guidance application may obtain subtitle data corresponding to a media asset, and identify a keyword from the subtitle data. The media guidance application may then determine, by searching a product advertisement database, whether the identified keyword relates to a product advertisement corresponding to a product. In response to determining that the identified keyword relates to the product advertisement corresponding to the product, the media guidance application may determine an advertisement phrase from the product advertisement database. The advertisement phrase may be determined based on various factors. For example, in one embodiment, the advertisement phrase may be chosen based on available display capacity at the subtitle region within a video frame of the media asset. For another example, the advertisement phrase may be chosen from the product advertisement database based on semantic context matching of the subtitle data as further described below. The media guidance application may then generate for display, at the subtitle region of the video frame of the media asset, the first subtitle data including the determined advertisement phrase. By targeting product advertisements to keywords in the subtitle data, the media guidance application may more precisely target the advertisements than conventional systems that relied on targeting based on a user demographic or the entire media asset.

The media guidance application may insert advertising text into the subtitle of a live programming or a previously stored media asset. Specifically, the media guidance application may obtain media guidance data indicating availability of a plurality of media assets, and determine, based on the media guidance data, a media asset that is likely to be played at a later time. For example, the media guidance application may read a program schedule listing of a channel that a user is viewing and determine the media asset to be aired next on the channel. For another example, the media guidance application may determine, based on a listing of available previously stored media assets in the digital video recorder (DVR), the media asset that has been recently stored, the media asset that the user has started viewing but has not finished, the media asset that the user has added to a watch list, and/or the like. By obtaining the media guidance data and determining the media asset likely to be played later, the media guidance application may reduce lag time associated with selecting and inserting the product advertisement into the subtitle data.

The media guidance application may then obtain subtitle data corresponding to the media asset. Specifically, the media guidance application may receive metadata corresponding to the media asset, and determine whether subtitle data is available from the metadata. For example, in response to determining that subtitle data is unavailable from the metadata, the media guidance application may buffer and delay the playback of a portion of the received media asset to generate subtitle data for the buffered portion, e.g., by performing speech-to-text recognition of an audio file corresponding to the buffered portion. For example, by determining whether subtitle data is available from the metadata, the media guidance application may determine whether or not subtitle data, within which the product advertisement is placed, needs to be generated.

The media guidance application may then identify one or more keywords from the subtitle data as possible candidates relating to advertisements. For example, the media guidance application may choose words, or a combination of words from the subtitle that relates to a product name, a brand name, an advertisement slogan, and/or the like. Specifically, the media guidance application may compare the subtitle data with a plurality of advertisement texts from the product advertisement database. The media guidance application may determine, from the subtitle data, that a word or a combination of words from the first subtitle data at least partially matches with an advertisement text from the plurality of advertisement texts. For example, a subtitle line of "You can do this, just do it" contains the combination of words "just do it" that match with a Nike advertisement "Nike, just do it!" For example, by using keywords from the subtitle data as possible candidates relating to advertisements, the media guidance application may more precisely target the advertisements than conventional systems that relied on targeting based on a user demographic or the entire media asset.

For each identified keyword from the first subtitle data, the media guidance application may then determine an advertisement phrase to annotate the respective keyword. For example, the media guidance application may annotate the subtitle line "You can do this, just do it" with "just do it WITH NIKE" with a visual effect to highlight that the words "WITH NIKE" is an advertisement phrase that is not part of the original subtitle of the media asset. Specifically, to determine the advertisement phrase, the media guidance application may transmit a query based on the respective identified keyword to a product advertisement database storing advertisement information relating to a plurality of products. In response to the transmitted query, the media guidance application may obtain a query result indicating the respective identified keyword matches an advertisement text corresponding a product, e.g., the words "just do it" from the subtitle matches an advertisement text "Nike, just do it."

The media guidance application may select an advertisement text to insert into a subtitle line when the subtitle line contains keywords that match with different advertisement texts. For example, the subtitle line "I am going to have steak for dinner" may contain keywords "steak" and "dinner" that both match with advertisement texts. In this case, the media guidance application may select one advertisement text to annotate the subtitle line to avoid too many annotations in a single subtitle line. Specifically, the media guidance application may rank a set of advertisement texts from queries corresponding to the one or more keywords in the subtitle data based on each relevance level corresponding to each respective advertisement text.

In some embodiments, the media guidance application may rank the keyword-matched advertisement texts based on significance of the keywords in the context of the subtitle line. For example, for the subtitle line of "you can do this, just do it!" the media guidance application may choose to insert an advertisement phrase for "Just do it with NIKE" instead of any advertisement phrase that contains the word "you." Specifically, for each keyword that matches with a respective advertisement text, the media guidance application may determine an overlapping portion between the respective keyword and the respective advertisement text and a non-overlapping portion not included in the respective keyword from the respective advertisement text. The media guidance application may then analyze the overlapping portion and the non-overlapping portion in a context of the respective advertisement text to determine whether the overlapping portion contains more significant words than the non-overlapping portion in the context of the respective advertisement text. In the above example, the keyword combination "just do it" has a high overlapping portion with the advertisement text "Nike, just do it" and may be deemed as significant. In this case, the media guidance application may assign a first relevance level to the respective advertisement text. In another example, the keyword "you" has a low overlapping portion with any advertisement text that includes the word "you," e.g., "you deserve the best price and service," etc. In this case, the media guidance application may assign a second relevance level lower than the first relevance level to the respective advertisement text.

In some embodiments, the media guidance application may rank the keyword-matched advertisement texts based on user interests in the advertised product. Specifically, the media guidance application may retrieve a user profile corresponding to a user who is likely to play back the media asset, and obtain one or more key terms indicating user interests from the user profile. For example, the user profile may include user interest indicators such as sports, tennis, soccer, drama, and/or the like. The media guidance application may then compare the one or more key terms with set of advertisement text and identify a similarity between the respective advertisement text and the one or more key terms indicating user interests. The media guidance application may then assign a respective relevance level to each advertisement text based on the similarity. For example, when the media guidance application identifies an advertisement text for "Nike, just do it" in the subtitle line "you should carry on and just do it," and the user profile indicates the user is interested in sports, the media guidance application may identify the category of the advertised product "Nike," sports goods is similar to the user interest of sports. In this case, the media guidance application may assign a high relevance level to the advertisement text "Nike, just do it" because it matches with the user interest.

In some embodiments, the media guidance application may rank the keyword-matched advertisement texts based on availability of the advertised products to the specific location where the user is located at. Specifically, the media guidance application may determine a location where the media asset is likely to be played back. For example, the media guidance application may determine the location of a household user equipment, the location of a user mobile device where the media asset is played, and/or the like. For each advertisement text from the set of advertisement texts, the media guidance application may assign a relevance level to the advertisement text based on availability of the advertised product to the location. For example, in response to determining that a respective product corresponding to the respective advertisement text is exclusively available in the location, assigning the highest relevance level to the respective advertisement text. For another example, in response to determining that the respective product corresponding to the respective advertisement text is available across different locations, the media guidance application may assign a medium relevance level lower than the highest relevance level to the respective advertisement text. In response to determining that the respective product corresponding to the respective advertisement text is unavailable in the location, the media guidance application may assign the lowest relevance level to the respective advertisement text.

The media guidance application may then select an advertisement text having the highest relevance level from the set of advertisement texts, as a candidate to insert into the subtitle data. Specifically, the media guidance application may determine an advertisement phrase from the selected advertisement text based on available display time and space corresponding to the subtitle data at a subtitle region within a video frame of the media asset. For example, the media guidance application may curb the original advertisement text to fit the available space of the subtitle display region on the screen.

The media guidance application may generate for display, at the subtitle region of the video frame of the media asset, the first subtitle data having the determined advertisement phrase. In some embodiments, the media guidance application may insert a textual advertisement phrase in line into a subtitle line subject to the available display area of the subtitle region. Specifically, the media guidance application may determine a first amount of characters in the subtitle data, e.g., the subtitle line "you should carry on and just do it" contains 36 characters. The media guidance application may retrieve a maximum number of characters of the subtitle region, e.g., a maximum of 50 characters. The media guidance application may determine a difference in the maximum number of characters and the first amount of characters, e.g., remaining space of 14 characters for displaying an inserted advertisement. In response to determining that the difference is less than an amount of characters contained in the selected advertisement text, the media guidance application may select a subset of characters from the amount of characters contained in the selected advertisement text to form the advertisement phrase having an amount of characters less than the difference. For example, an advertisement text "Nike, just do it" contains 17 characters that exceeds the remaining space of 14 characters. In this case, the media guidance application may choose the phrase "Nike" from the advertisement text to insert into the subtitle line. The media guidance application may determine a position within the subtitle data for inserting the determined advertisement phrase based on a corresponding keyword from the subtitle data that relates to the advertisement phrase. In the above example, the advertisement phrase "Nike" is to be inserted after the words "just do it." The media guidance application may then insert the determined advertisement phrase into the first subtitle data at the determined position, e.g., "you should carry on and just do it NIKE!" For example, by analyzing the number of characters of the subtitle region available and the number of characters needed for a product advertisement, the media guidance application ensures that the subtitles stay synchronized with the media asset even after the product advertisement is inserted.

In some embodiments, the media guidance application may insert an advertisement text between subject lines when there is sufficient time between the subject lines. Specifically, the media guidance application may retrieve a tag-out time corresponding to a first subtitle line, and a tag-in time corresponding to a second subtitle line subsequent to the first subtitle line. The media guidance application may then determine a duration between the tag-out time of the first subtitle line and the tag-in time of the second subtitle line. In response to determining that the duration is greater than a threshold, the media guidance application may insert the determined advertisement phrase between the first subtitle line and the second subtitle line for display between the tag-out time corresponding to the first subtitle line and the tag-in time corresponding to the second subtitle line. For example, if the media guidance application has determined that there is sufficient time after the subtitle line "you should carry on and just do it" before the next subtitle line is to be displayed, the media guidance application may generate and display the advertisement text "Nike, just do it" at the subtitle region between the subtitle line and the next subtitle line. For example, by inserting an advertisement text between subject lines when there is sufficient time between the subject lines, the media guidance application ensures that the subtitles stay synchronized with the media asset even after the product advertisement is inserted.

In some embodiments, the media guidance application may format the advertisement text or phrase in a different color or font size for display with the subtitle so that the audience can distinguish the advertisement text from the subtitle text. In some embodiments, the media guidance application may generate an audio file along with the inserted advertisement text. For example, when the subtitle line "you should carry on and just do it" is inserted with an advertisement phrase to be "you should carry on and just do it WITH NIKE," the media guidance application may generate an audio file corresponding to the advertisement phrase "WITH NIKE" to supplement the original audio track of the media asset, or may generate an audio file corresponding to the new subtitle line "you should carry on and just do it WITH NIKE" to replace the audio segment corresponding to the original subtitle line. For example, formatting the advertisement text or phrase, the media guidance application may ensure that the advertisement text or phrase is not confused with and/or stands out from the text of the subtitles in order to better capture the attention of a viewer.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 provides an example diagram illustrating modifying a subtitle file to include advertisement texts, according to embodiments described herein;

DETAILED DESCRIPTION

Figure 1:
FIG. 1 provides an example diagram illustrating user equipment displaying a media asset having an advertisement text displayed within the displayed subtitle line of the media asset, according to embodiments described herein.

Systems and methods are disclosed herein for inserting an advertisement into a subtitle of a media asset for display as part of the subtitle of the media asset. For example, existing systems insert video advertisements during commercial breaks of media asset transmission, which usually incurs significant production costs to the advertisers but may not effectively reach the users because users often switch channels at a commercial break. Embodiments described herein provide a way to insert advertisement texts into the subtitle of the media asset based on the content of the displayed subtitle. Specifically, a media guidance application, which is implemented at a set-top box of user equipment, may be used to analyze the metadata corresponding to the media asset to identify keywords from the subtitle data that relates to product names, brand names, advertisement slogans, descriptive terms relating to products or advertisements, and/or the like. By identifying such texts, the media guidance application may associate advertisement phrases with the specific text of the subtitle. Such advertisement phrases may then be inserted into the subtitles for display as part of the subtitle of the media asset. As users generally pay attention to the subtitle when watching a media asset, an advertisement displayed as part of the subtitle of the media asset can reach a user in an inexpensive and efficient way.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application implemented on a set-top box, or any other application that receives media guidance data and that can be configured to remotely communicate with a set-top box.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 provides an example diagram illustrating user equipment displaying a media asset having an advertisement text displayed within the displayed subtitle line of the media asset, according to embodiments described herein. FIG. 1 shows user equipment 106 that may include a step-top box, on which the media guidance application is implemented. The screen of user equipment 106 may display an interactive media guidance application, which may cause the display of a media asset 108 to the audience users. While the media asset 108 is being displayed, subtitle or caption 112 corresponding to the media asset may be displayed, e.g., within a subtitle region within the video frame of the media asset 108.

The media guidance application may insert advertising text into the subtitle of a live programming or a previously stored media asset. For example, as shown at 114 in FIG. 1, when the subtitle line 112 includes "There is a lot we'll have to bring you up to speed on," extra advertisement text "WITH GOODYEAR TYRES" may be displayed (e.g., at 114) as supplement to the words "speed on" for advertising purpose. To identify words from the subtitle line and select a relevant advertisement text to insert into the subtitle line, the media guidance application retrieves data corresponding to a media asset, and analyzes the subtitle data to identify keywords as candidate to pair with previously stored advertisement texts.

First, the media guidance application may obtain media guidance data indicating availability of a plurality of media assets, and determine, based on the media guidance data, a media asset that is likely to be played at a later time. For example, the media guidance application may read a program schedule listing of a channel that a user is viewing and determine the media asset to be aired next on the channel. In another example, the media guidance application may retrieve a viewing history corresponding to a user profile and predict a channel that the user may likely watch at a later time, e.g., a television show that the user regularly follows. In another example, the media guidance application may identify a program that the user may likely watch at the transmission time based on popularity of the program, e.g., the number of users who have scheduled recordings of the program, the amount of electronic messages such as social media posts that relate to the program, and/or the like.

For another example, the media guidance data may also include an inventory of previously stored media assets (e.g., previous recordings made by the user), on-demand programs, and/or the like. The media guidance application may then identify a media asset that has been recently stored or made available, a media asset that the user has started viewing but has not finished, a media asset that the user has added to a watch list, a media asset that has been watched by a friend or a social influencer to the user, and/or the like, as the media asset that the user may likely to watch at a later time.

The media guidance application may then obtain subtitle data corresponding to the identified media asset that the user may watch at a later time. Specifically, the media guidance application may receive metadata corresponding to the media asset, and determine whether subtitle data is available from the metadata. For example, the media guidance application may retrieve a subtitle data file from the metadata, e.g., similar to 301 in FIG. 3. The subtitle data file includes a list of subtitle lines, and for each a subtitle line, a tag-in time of the subtitle line (e.g., the playback position when the display of the subtitle line will start) and a tag-out time of the subtitle line (e.g., the playback position when the display of the subtitle line will end). In another example, in response to determining that subtitle data is unavailable from the metadata, the media guidance application may generate subtitle data from the media asset. For instance, when the media asset is a previously stored media asset, the media guidance application may retrieve an audio file corresponding to the media asset and perform speech-to-text recognition to generate a text subtitle file. For another example, when the media guidance application receives the media asset 108 from live programming of a linear source, the media guidance application may buffer and delay the playback of a portion of the received media asset 108 to generate subtitle data for the buffered portion, e.g., by performing speech-to-text recognition of an audio file corresponding to the buffered portion.

The media guidance application may then identify one or more keywords from the subtitle data as possible candidates relating to advertisements. The media guidance application may choose words, or a combination of words from the subtitle that relates to a product name, a brand name, an advertisement slogan, and/or the like. For example, as shown in FIG. 3, words from the subtitle data such as "bag," "apartment," and/or the like may be identified as these object names may relate to previously stored advertised products. For another example, words from the subtitle data such as "speed on," "surprise me," "just do it," and/or the like, may be identified as candidates for advertisement insertion, because these words may match with advertisement slogans, adjectives or other words used in advertisement texts.

Figure 6:
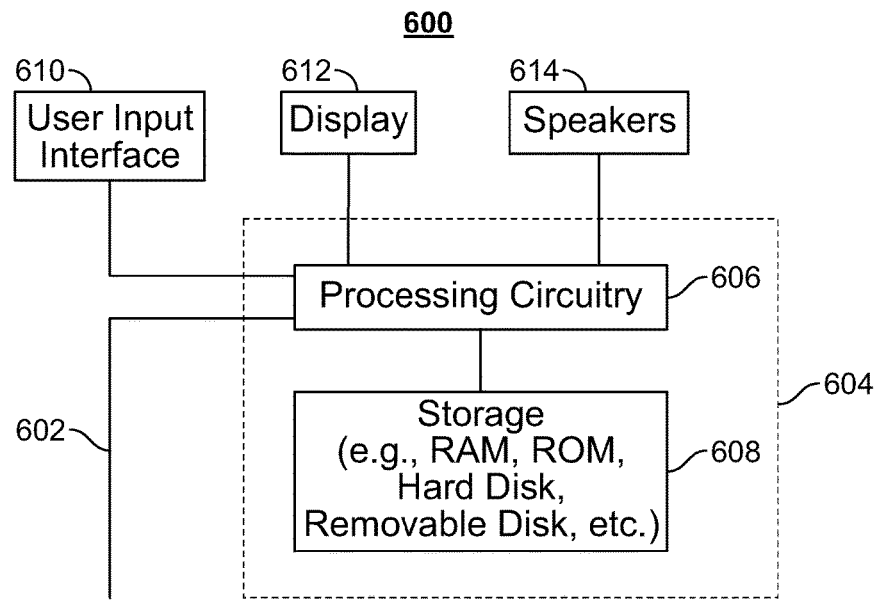
FIG. 6 is a block diagram of an illustrative user equipment (UE) device in accordance with some embodiments of the disclosure.
Figure 7:
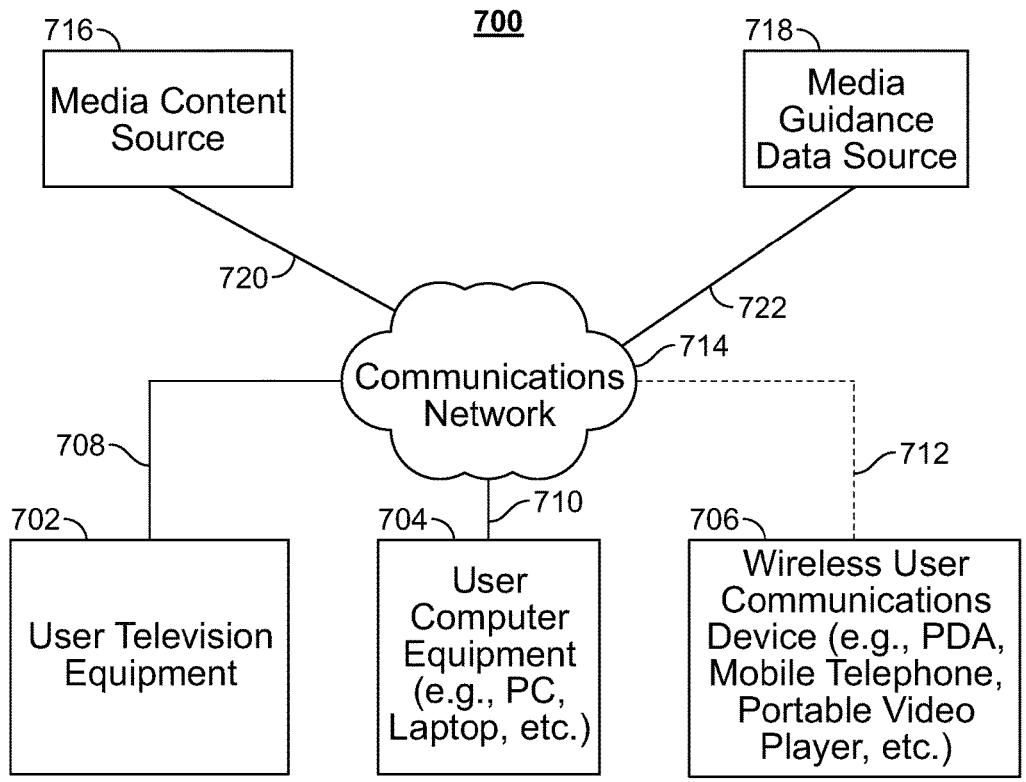
FIG. 7 is a block diagram of an illustrative media system in accordance with some embodiments of the disclosure.

Specifically, to identify the one or more keywords as possible candidates relating to advertisements, the media guidance application may compare the subtitle data with a plurality of advertisement texts from a product advertisement database, e.g., at storage 608 in FIG. 6 or data source 718 in FIG. 7 via communications network 714. The media guidance application may determine, from the subtitle data, that a word or a combination of words from the first subtitle data at least partially matches with an advertisement text from the plurality of advertisement texts. For example, a subtitle line of "You can do this, just do it" contains the combination of words "just do it" that match with a Nike advertisement "Nike, just do it!" For another example, words identifying an object such as "bag" or "apartment" may be identified as relating to similar objects of a brand name. For another example, action or descriptive words such as "speed on," or "surprise me" may be identified as matching with similar action or descriptive words used in advertisement texts, e.g., "speed on" as used in the "Goodyear tires" advertisement, and "surprise me" as used in the "TiVo, surprise me" advertisement.

For each identified keyword from the first subtitle data, the media guidance application may then determine an advertisement phrase to annotate the respective keyword. For example, the media guidance application may annotate the subtitle line "You can do this, just do it" with "just do it WITH NIKE" with a visual effect to highlight that the words "WITH NIKE" as an advertisement phrase that is not part of the original subtitle of the media asset. For example, the media guidance application may format the advertisement phrase "WITH NIKE" in a different color, different font type or size, with underline or highlight, such that the phrase "WITH NIKE" is visually distinguishable from the actual text of the subtitle line.

Specifically, to determine the advertisement phrase, the media guidance application may transmit a query based on the respective identified keyword to the product advertisement database storing advertisement information relating to a plurality of products. For example, as described above, the product advertisement database may be housed at storage 608 in FIG. 6, or data source 718 accessible via communications network 714 in FIG. 7. Each entry of the product advertisement database may identify a brand name, a product name, an advertisement text, other words such as nouns, adjectives, adverbs, which have been associated with the product as descriptive of the brand-name product. For example, in some embodiments, the media guidance application may update entries of the product advertisement database to supplement words or a combination of words that are to be associated with an advertised product. For example, for an advertised product "Goodyear tires," the media guidance application may store words such as "cars," "road," "transportation," "speed," "endurance," and/or the like, as relating to "Goodyear tires." In some implementations, advertisers may bid for words to be associated with a certain word or a combination of words. For example, the words "speed on" may be associated with "Goodyear tires," "super broadband network," and/or other advertised products, depending on the bidding price from different brand names or advertisers.

In response to the transmitted query, the media guidance application may obtain a query result indicating the respective identified keyword matches an advertisement text corresponding a product. For example, the keyword, e.g., the combination of words "just do it" from the subtitle matches an advertisement text "Nike, just do it." For another example, the keyword, e.g., the combination of words "speed on" may match with advertisement text, or terms that have been stored with the product "Goodyear tires."

In some embodiments, the media guidance application may select an advertisement text to insert into a subtitle line when the subtitle line contains keywords that match with different advertisement texts. For example, the subtitle line "there's a lot we'll have to bring you up to speed on" may contain keywords "bring" and "speed on" that both match with advertisement texts, e.g., the word "bring" may match with various advertisement texts such as "Colgate, always brings your smile back," etc. while the words "speed on" may match with the advertisement text for "Goodyear tires." In this case, the media guidance application may insert advertisement phrases for both "bring" and "speed on." Or alternatively, the media guidance application may select one advertisement text to annotate the subtitle line to avoid too many annotations in a single subtitle line. Specifically, the media guidance application may rank a set of advertisement texts from queries corresponding to the one or more keywords in the subtitle data based on each relevance level corresponding to each respective advertisement text.

In some embodiments, the media guidance application may rank the keyword-matched advertisement texts based on significance of the keywords in the context of the subtitle line. For example, for the subtitle line of "there's a lot we'll have to bring you up to speed on" which contains words "bring" and "speed on" both matching with advertisement texts, the media guidance application may determine which advertisement text to insert, e.g., depending on which word matches with the respective advertisement text to a higher degree. Specifically, for each keyword that matches with a respective advertisement text, the media guidance application may determine an overlapping portion between the respective keyword and the respective advertisement text and a non-overlapping portion not included in the respective keyword from the respective advertisement text. The media guidance application may then analyze the overlapping portion and the non-overlapping portion in a context of the respective advertisement text to determine whether the overlapping portion contains more significant words than the non-overlapping portion in the context of the respective advertisement text. In the above example, the keyword combination "speed on" overlaps with the advertisement text "speed on with Goodyear tires" with the words "speed on," which includes every word in the advertisement text other than the brand name or the product name "Goodyear tires." In this case, the media guidance application may assign a relatively high relevance level to the respective advertisement text "speed on with Goodyear tire" as the keyword "speed on" in the subtitle line overlaps a significant portion with the advertisement text. In another example, the keyword "bring" overlaps with the advertisement text "Colgate, always brings your smile back" with only the word "brings," leaving a much larger non-overlapping portion including words "Colgate," "always," "your smile back." In this case, the word "brings" is considered as having a low overlapping portion with the advertisement text and thus the media guidance application may assign a relatively lower relevance level to the respective advertisement text. Thus, the advertisement text "speed on with Goodyear tires" having a higher relevance level may be chosen to be inserted into the subtitle line.

In some embodiments, the media guidance application may rank the keyword-matched advertisement texts based on user interests in the advertised product. Specifically, the media guidance application may retrieve a user profile corresponding to a user who is likely to play back the media asset, and obtain one or more key terms indicating user interests from the user profile. For example, the user profile may include user interest indicators such as sports, tennis, soccer, drama, cars, and/or the like. In the above example of the subtitle line of "there's a lot we'll have to bring you up to speed on" which contains words "bring" and "speed on" both matching with advertisement texts for Colgate and Goodyear tires, respectively, the media guidance application may identify Goodyear tires may better match with the user interests which contains "cars." Specifically, the media guidance application may compare the one or more key terms with set of advertisement texts and identify a similarity between the respective advertisement text and the one or more key terms indicating user interests. The media guidance application may then assign a respective relevance level to each advertisement text based on the similarity. For example, the words "speed on" that matches with an advertisement text for "Goodyear tires" may be assigned with a higher relevance level because "Goodyear tires" shares a similarity with the user interest of "cars," but the keyword "bring" that matches with an advertisement for "Colgate toothpaste" does not share any similarity of the stored user interests in the use profile.

In some embodiments, the media guidance application may rank the keyword-matched advertisement texts based on availability of the advertised products to the specific location where the user is located at. Specifically, the media guidance application may determine a location where the media asset is likely to be played back. For example, the media guidance application may retrieve a registered location of a household user equipment from a user profile, or may track the location of a user mobile device where the media asset is played or where the user is located at, and/or the like. For each advertisement text from the set of advertisement texts, the media guidance application may assign a relevance level to the advertisement text based on availability of the advertised product to the location. For example, in response to determining that a respective product corresponding to the respective advertisement text is exclusively available in the location, e.g., a restaurant coupon for a local restaurant, etc., the media guidance application may assign the highest relevance level to the respective advertisement text. For another example, in response to determining that the respective product corresponding to the respective advertisement text is available across different locations, e.g., an advertisement to a consumer product that is available nationwide such as "Colgate toothpaste," the media guidance application may assign a medium relevance level lower than the highest relevance level to the respective advertisement text. For another example, in response to determining that the respective product corresponding to the respective advertisement text is unavailable in the location, e.g., an advertisement to a restaurant that is located at a different city, the media guidance application may assign the lowest relevance level to the respective advertisement text.

In some embodiments, the media guidance application may rank the advertisement texts based on a combined relevance level of each advertisement text based on the degree of word matching, user interests and/or the availability in the user location as described above. For example, the media guidance application may compute a weighted sum of the relevance levels based on different relevance levels decided based on the degree of word matching, user interests and/or the availability in the user location as described above. The weighted sum corresponding to each advertisement text may be used as the metric to rank the set of advertisement texts.

The media guidance application may then select an advertisement text having the highest relevance level from the set of advertisement texts, as a candidate to insert into the subtitle data. Specifically, the media guidance application may determine an advertisement phrase from the selected advertisement text based on available display time and space corresponding to the subtitle data at a subtitle region within a video frame of the media asset.

The media guidance application may generate for display, at the subtitle region of the video frame of the media asset, the first subtitle data having the determined advertisement phrase. In some embodiments, the media guidance application may insert a textual advertisement phrase in line into a subtitle line subject to the available display area of the subtitle region. For example, as shown in FIG. 1, the selected advertisement phase "WITH GOODYEAR TIRES" 114 may be inserted into the subtitle line 112, and be formatted with capitalized letters, a different color or font size to be distinguished from the original subtitle line.

In some embodiments, the media guidance application may curb the original advertisement text to fit the available space of the subtitle display region on the screen. Specifically, the media guidance application may determine a first amount of characters in the subtitle data, for example, a subtitle line "you should carry on and just do it" contains 36 characters. The media guidance application may retrieve a maximum number of characters of the subtitle region, e.g., a maximum of 50 characters. The media guidance application may determine a difference in the maximum number of characters and the first amount of characters, e.g., remaining space of 14 characters for displaying an inserted advertisement. In response to determining that the difference is less than an amount of characters contained in the selected advertisement text, the media guidance application may select a subset of characters from the amount of characters contained in the selected advertisement text to form the advertisement phrase having an amount of characters less than the difference. For example, an advertisement text "Nike, just do it" that has been selected to match with the keywords "just do it" for the subtitle line in the above example contains 17 characters that exceeds the remaining space of 14 characters. In this case, the media guidance application may choose the phrase "Nike" from the advertisement text to insert into the subtitle line. The media guidance application may determine a position within the subtitle data for inserting the determined advertisement phrase based on a corresponding keyword from the subtitle data that relates to the advertisement phrase. In the above example, the advertisement phrase "Nike" is to be inserted after the words "just do it." The media guidance application may then insert the determined advertisement phrase into the first subtitle data at the determined position, e.g., "you should carry on and just do it NIKE!"

Figure 2:
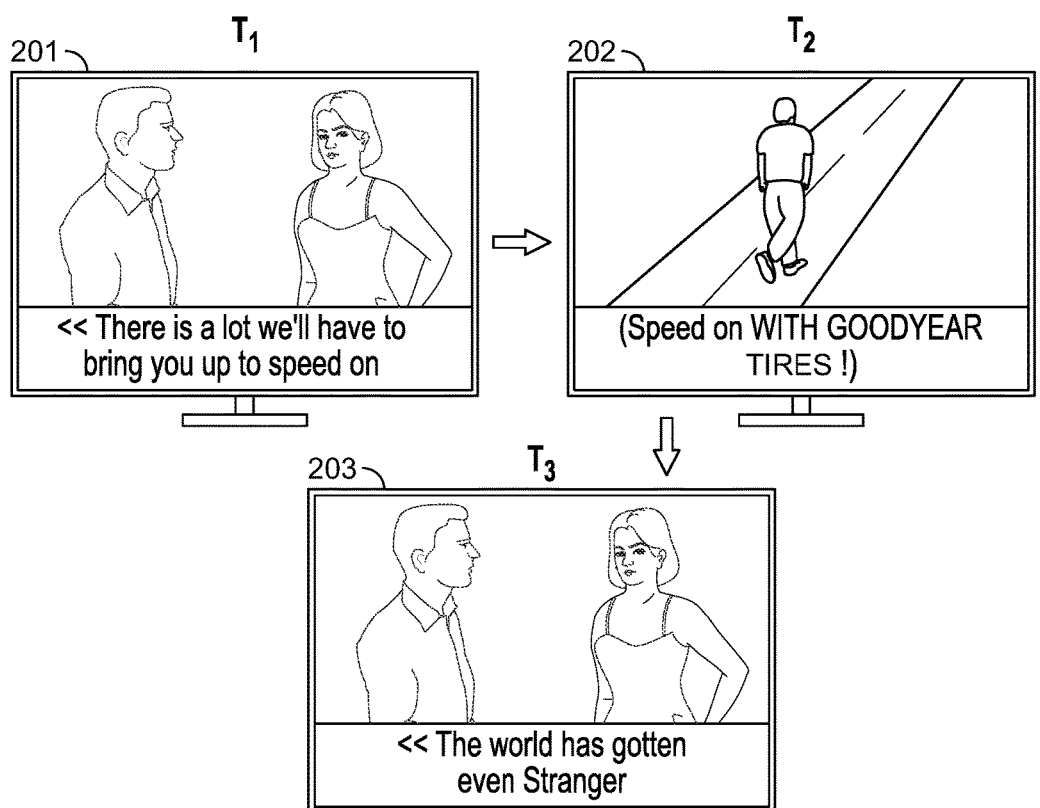
FIG. 2 provides an example diagram illustrating user equipment displaying a media asset having an advertisement text displayed between consecutive subtitle lines, according to embodiments described herein.

In some embodiments, the media guidance application may insert an advertisement text between subject lines when there is sufficient time between the subject lines. Specifically, the media guidance application may retrieve a tag-out time corresponding to a first subtitle line, and a tag-in time corresponding to a second subtitle line subsequent to the first subtitle line. For example, as shown in FIG. 2, at frame 201, the tag-out time for the subtitle line "there's a lot we'll have to bring you up to speed on" is represented by T1, and the tag-in time for the next subtitle line "The world has gotten even stranger" is T3 at frame 203. The media guidance application may then determine a duration between the tag-out time of the first subtitle line and the tag-in time of the second subtitle line. For example, the media guidance application may determine whether the duration T3-T1 is greater than a threshold, e.g., 10 seconds, 15 seconds, or a threshold number of frames. In response to determining that the duration is greater than a threshold, the media guidance application may insert the determined advertisement phrase between the first subtitle line and the second subtitle line for display between the tag-out time corresponding to the first subtitle line and the tag-in time corresponding to the second subtitle line. For example, as shown at frame 202, when the duration T3-T1 is greater than the threshold, the full advertisement text "speed on with GOODYEAR TIRES!" may be displayed at the subtitle region between the subtitle lines.

In some embodiments, in response to determining that the duration is shorter than a threshold, the media guidance application may optionally modify the subtitle data to increase the duration between the subtitle lines such that an advertisement text may be displayed between the subtitle lines.

In some embodiments, as the inserted advertisement phrase may change the display size of the subtitle area, the media guidance application may determine an appropriate display position of the subtitle not to overlap with an informative object in the video. For example, when the media asset corresponds to a football match, the media guidance application may determine the location of the football within each video frame to ensure the displayed subtitle line including the advertisement phrase does not interfere with the image of the football. Specifically, the media guidance application may retrieve a tag-in time and a tag-out time corresponding to the first subtitle data, and retrieve a video frame from the media asset to be displayed between the tag-in time and the tag-out time. The media guidance application may then determine a first portion of the video frame that relates to an informative object, and then determine a second portion of the video frame for displaying the first subtitle data modified by the determined advertisement phrase without overlapping the first portion of the video frame. For example, the media guidance application may identify the object of a "football" in the media asset, and track the movement trajectory of the "football" such that when an advertisement phrase is inserted into the subtitle area, the media guidance application may ensure that the display of the subtitle line does not overlap with the image of the football. Further description of determining a portion relating to an informative object can be found in commonly-owned U.S. Pat. No. 9,681,165, which is hereby expressly incorporated herein by reference in its entirety.

FIG. 3 provides an example diagram illustrating modifying a subtitle file to include advertisement texts, according to embodiments described herein. Block 301 shows the original subtitle file that includes a list of subtitle entries (e.g., 305). Each subtitle entry 305 include a textual subtitle line (e.g., 307), each of which is to be displayed within a subtitle region of the video frame of the media asset according to a tag-in time and a tag-out time (e.g., 306). For example, the media guidance application may identify a keyword "speed on" 308 from the subtitle line 307 as a candidate based which to select and insert an advertisement text. For another example, the media guidance application may identify keywords such as "surprise me," "apartment," "bag" and/or the like candidates based which to select and insert an advertisement text, from the subtitle file 301.

Block 302 shows an example modified subtitle file with inserted advertisement text. For example, a modified subtitle entry 315, as compared with the original subtitle entry 305, includes the added advertisement phrase "WITH GOOD-YEAR TIRES" 316 at a position following the keyword "speed on." Thus, the media guidance application may read the modified subtitle entry 315 and display the subtitle line "speed on WITH GOODYEAR TIRES" at the subtitle region according to the tag-in time and the tag-out time of the subtitle entry 315.

In some embodiments, the media guidance application may format the advertisement text or phrase in a different color or font size for display with the subtitle so that the audience can distinguish the advertisement text from the subtitle text. In some embodiments, the media guidance application may generate, retrieve from a local or cloud storage (e.g., storage 608 in FIG. 6 or data source 718 in FIG. 7), an audio file along with the inserted advertisement text. Specifically, the media guidance application may replace an audio segment of the media asset corresponding to a duration between the second tag-in time and the second tag-out time by the generated or the retrieved audio file, and play the generated or the retrieved audio file corresponding to the determined advertisement phrase in place of the audio segment while the media asset is being played during the duration between the second tag-in time and the second tag-out time. For example, when the subtitle line "you should carry on and just do it" is inserted with an advertisement phrase to be "you should carry on and just do it WITH NIKE," the media guidance application may generate or retrieve an audio file corresponding to the advertisement phrase "WITH NIKE" to supplement the original audio track of the media asset, or may generate an audio file corresponding to the new subtitle line "you should carry on and just do it WITH NIKE" to replace the audio segment corresponding to the original subtitle line.

In some embodiments, the media guidance application may determine the display time for the subtitle line with the advertisement phrase. For example, the media guidance application may retrieve a first tag-in time, e.g., 00:22:36, and a first tag-out time corresponding to the first subtitle data, e.g., 00:22:38 for the subtitle line 307. The media guidance application may insert the determined advertisement phrase (e.g., "WITH GOOD YEAR TIRES") at a corresponding keyword that is related to the advertisement phrase in the first subtitle data, or replacing the corresponding keyword with the advertisement phrase, e.g., at 315. With the changed display text, the media guidance application may estimate a second tag-in time and a second tag-out time corresponding the advertisement phrase within the first subtitle data. When the duration of display time of a subtitle line is determined by the number of characters in the subtitle line, the required duration for display the subtitle line 315 may be prolonged due to the inserted advertisement phrase 316. Thus, the required second tag-in time or the second tag-out time may not be the same with the first tag-in time and the first tag-out time, respectively. In this case, the media guidance application may adjust the tag-in or tag-out time to prolong the display time of the subtitle line 315.

To prolong the display duration of subtitle line 315, the media guidance application may either postpone the tag-out time or advance the tag-in time of subtitle line 315. Specifically, in one embodiment, the media guidance application may determine a number of characters of the first subtitle data modified by the determined advertisement phrase, e.g., the total number of letters in the subtitle line 315. In response to determining that the number of characters is greater than a threshold (e.g., 30, 35, etc.), the media guidance application may postpone the tag-out time corresponding to subtitle line 316 and the tag-in time of the subsequent subtitle line for an amount. The length of the postponed time amount is based on the number of characters of the inserted advertisement phrase 316. After the postponing, the duration between the tag-out time of the subtitle line 315 and the tag-in time of the subsequent subtitle line is maintained to be greater than a threshold duration, e.g., 0.5S, 1S, etc., to allow visual transition for the user.

Alternatively or simultaneously, the media guidance application may advance the tag-in time corresponding to subtitle line 315 to prolong the duration of subtitle line 315. The media guidance application may thus also advance the tag-out time corresponding to the previous subtitle line to ensure interval duration between the tag-out time of the previous subtitle line and the tag-in time of subtitle line 315 is greater than the threshold duration.

In some embodiments, the media guidance application may adjust the playback speed of the media asset when the subtitle line 307 is modified with the advertisement phrase 316 to result in the subtitle line 316 to be displayed, which may require a prolonged display duration, or a prolonged audio playback duration. Specifically, the media guidance application may adjust the frame playback speed of the media asset when subtitle line 315 is displayed, e.g., at a slower speed, to prolong the display duration of subtitle line 315. Or the media guidance application may adjust the audio playback speed of the generated or the retrieved audio file corresponding to subtitle line 315, e.g., at a faster speed, to complete playback of the audio file corresponding to subtitle line 315 within the tag-in time and the tag-out time corresponding to subtitle line 307.

Within embodiments, the media guidance application may perform the advertisement insertion as described in FIGS. 1-3 offline by analyzing a subtitle file (similar to 301 in FIG. 3), prior to displaying the media asset. In other embodiments, the media guidance application may perform the advertisement insertion, adjusting the tag-in or tag-out time to display the subtitle lines modified with advertisement insertion or replacement, and/or the like as described in FIG. 103 in real time while the media asset is being streamed from a media source, and/or being played.

Figure 4:
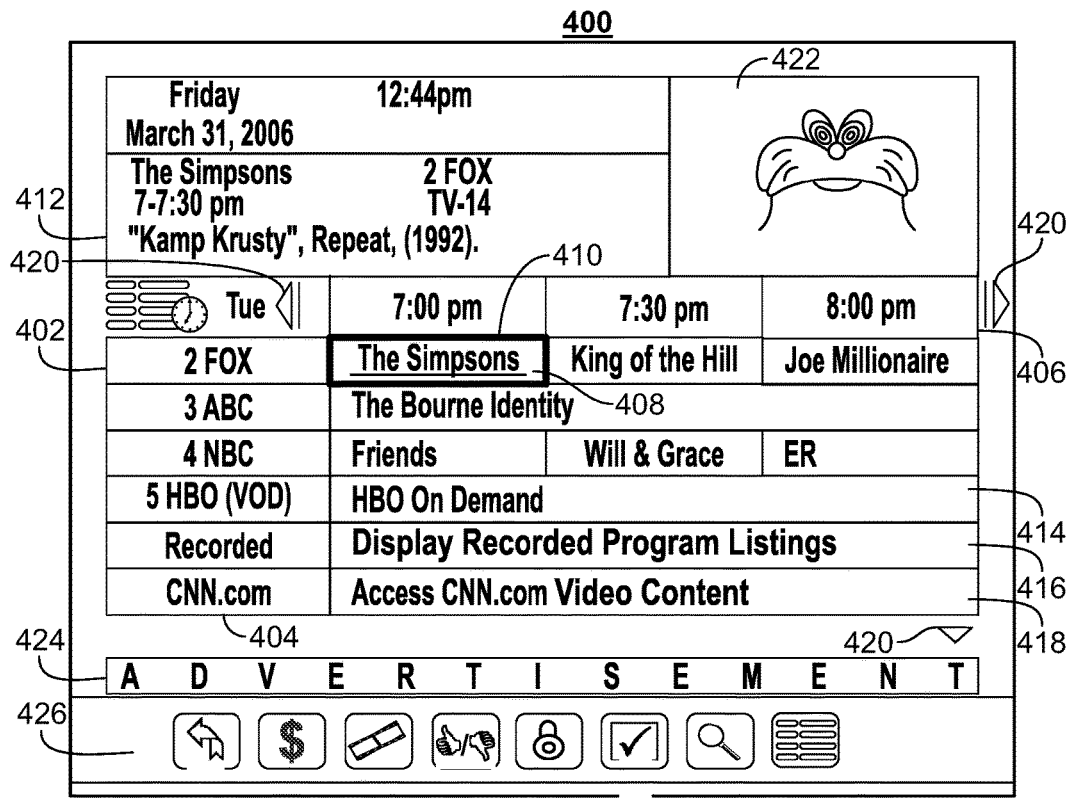
FIG. 4 shows an illustrative embodiment of a display screen that may be used to provide media guidance application listings and other media guidance information, in accordance with some embodiments of the disclosure.
Figure 5:
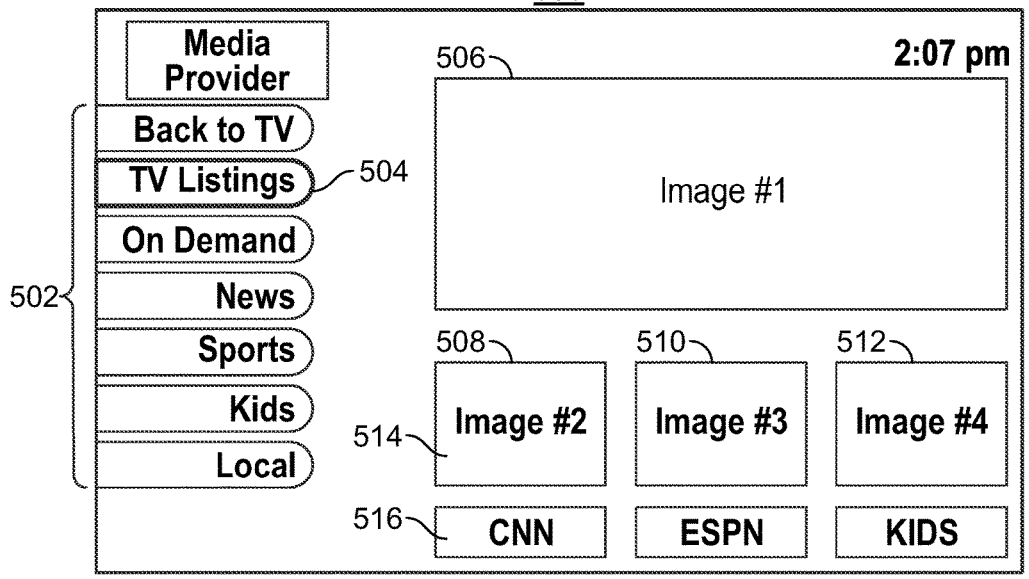
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform, e.g., user equipment 106 or the set-top box 120 in FIG. 1. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 4003 and Yuen et al. U.S. Pat. No. 6,239,794, issued May 49, 4001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 4D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 600 of FIG. 6 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 604 of a user equipment device 400. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 8:
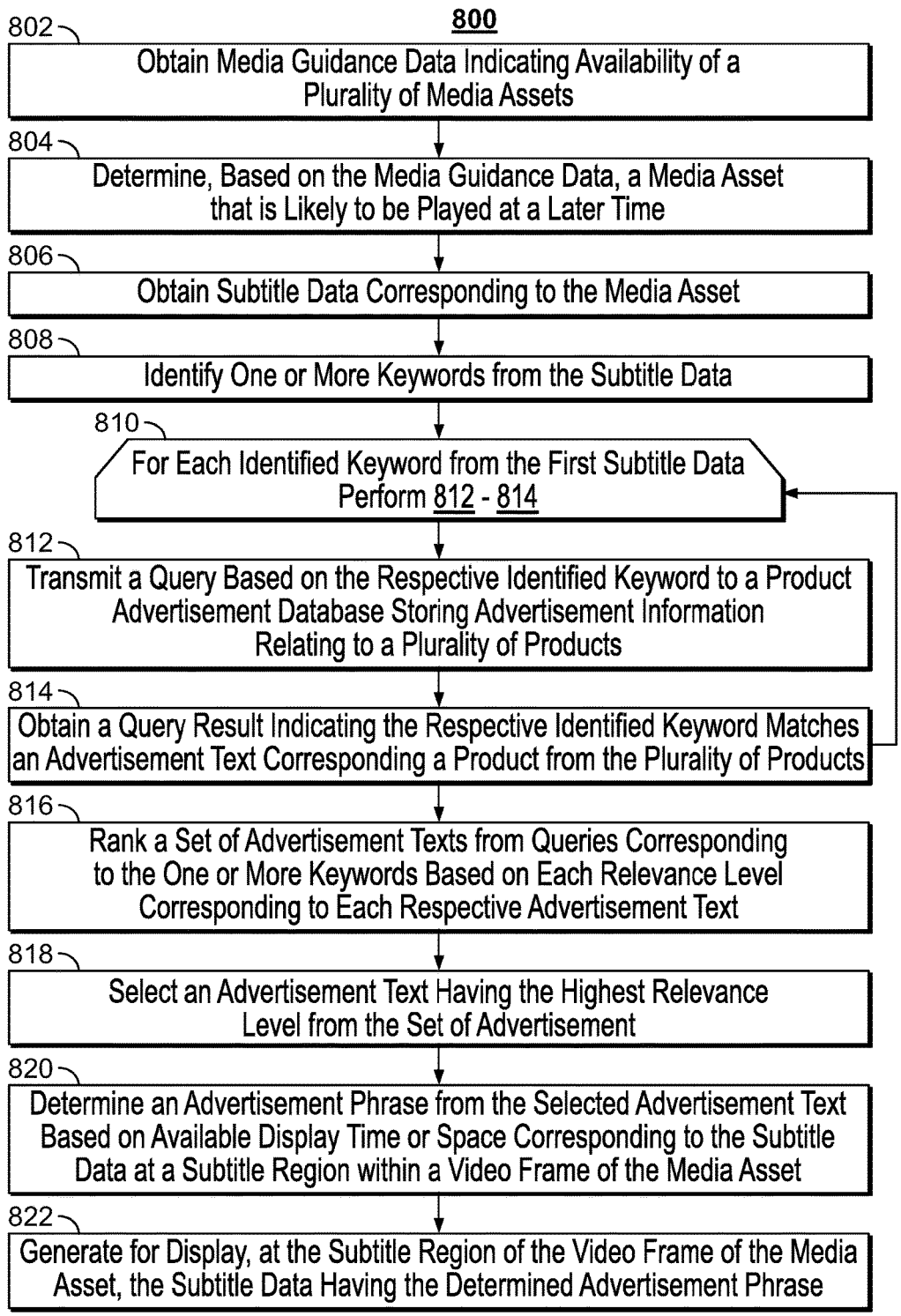
FIG. 8 depicts an illustrative flowchart of a process for inserting an advertisement into a subtitle of a media asset for display as part of the subtitle of the media asset, in accordance with some embodiments of the disclosure.

FIG. 8 depicts an illustrative flowchart of a process for inserting an advertisement into a subtitle of a media asset for display as part of the subtitle of the media asset, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 106, which may have the functionality of any or all of user television equipment 702, user computer equipment 704, and/or wireless communications device 706), or of a remote server separated from the user equipment by way of communications network 714.

Process 800 begins at 802, where control circuitry 604 obtains media guidance data, e.g., from the data source 718 via communications network 714 in FIG. 7, which indicates availability of a plurality of media assets. At 804, control circuitry 604 determines, based on the media guidance data, a media asset that is likely to be played at a later time. For example, control circuitry 604 retrieves a user profile containing user viewing history from storage 608 in FIG. 6, and reads a list of media assets previously stored in the watch list, or media assets that the user has started watching but has not completed, and/or the like. At 806, control circuitry 604 obtains first subtitle data corresponding to the media asset. For example, control circuitry 604 obtains a subtitle data file (e.g., see 301 in FIG. 3) from the data source 716 via communication network 714 in FIG. 7 while receiving the transmission of the media asset. At 808, control circuitry 604 identifies one or more keywords from the first subtitle data. For example, control circuitry 604 dissects the first subtitle data into a set of words, and transmits a query to a product advertisement database at storage 608 in FIG. 6 or at the data source 718 in FIG. 7, to identify whether a word or a combination of words from the subtitle data at least partially match with a stored advertisement text in the advertisement database.

At 810, for each identified keyword from the first subtitle data, process 800 repeats 812-814. Specifically, at 812, control circuitry 604 transmits a query based on the respective identified keyword to a product advertisement database storing advertisement information relating to a plurality of products. At 814, in response to the transmitted query, control circuitry 604 obtains a query result indicating the respective identified keyword matches an advertisement text corresponding a product from the plurality of products. After obtaining the matching advertisement text for each keyword, control circuitry 604 ranks a set of advertisement texts from queries corresponding to the one or more keywords based on each relevance level corresponding to each respective advertisement text, e.g., at 816. For example, control circuitry 604 determines a relevance level for each matched advertisement text based on different metrics, as further discussed in FIGS. 9-11. At 818, control circuitry 604 selects an advertisement text having the highest relevance level from the set of advertisement. At 820, control circuitry 604 determines an advertisement phrase from the selected advertisement text based on available display time and space corresponding to first subtitle data at a subtitle region within a video frame of the media asset. For example, control circuitry 604 reduces the characters of the advertisement text to fit into the subtitle region of a video frame of the media asset, as further described in FIG. 12. At 822, control circuitry 604 generates for display, e.g., via the display circuitry 612 in FIG. 6, at the subtitle region of the video frame of the media asset, the first subtitle data having the determined advertisement phrase.

Figure 9:
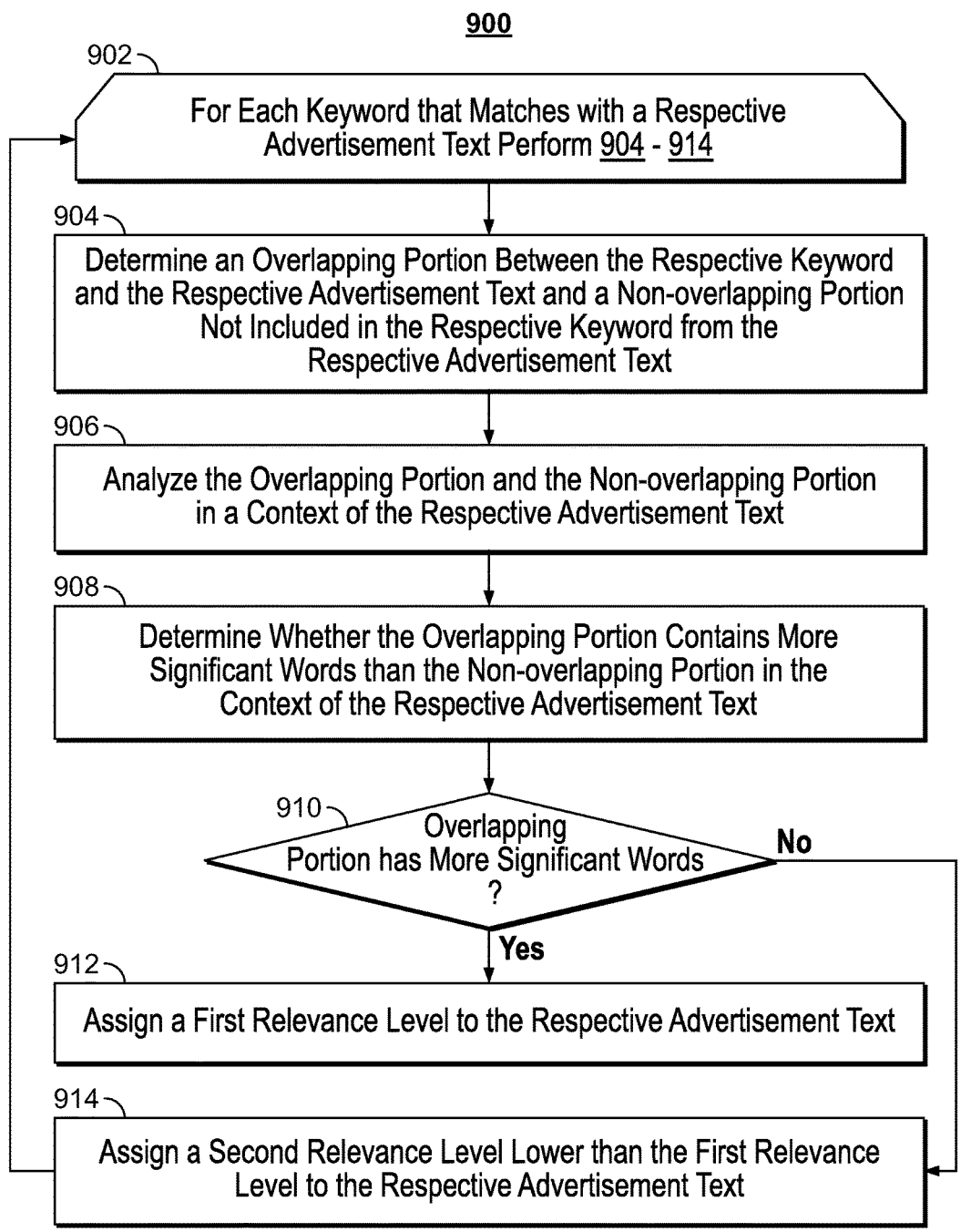
FIG. 9 depicts an illustrative flowchart of a process for ranking a set of advertisement texts from queries corresponding to the one or more keywords based on each relevance level corresponding to each respective advertisement text based on a degree of matching between the keyword and the advertisement text, in accordance with some embodiments of the disclosure.

FIG. 9 depicts an illustrative flowchart of a process for ranking a set of advertisement texts from queries corresponding to the one or more keywords based on each relevance level corresponding to each respective advertisement text (e.g., see 816 in FIG. 8) based on a degree of matching between the keyword and the advertisement text, in accordance with some embodiments of the disclosure. Process 900 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 900 begins at 902 and will repeat 902-914 for each keyword that matches with a respective advertisement text. Specifically, at 902, control circuitry 604 determines an overlapping portion between the respective keyword and the respective advertisement text and a non-overlapping portion not included in the respective keyword from the respective advertisement text. For example, as discussed in relation to FIG. 1, control circuitry 604 determines, from the subtitle line "there's a lot we'll have to bring you up to speed on" may contain keywords "bring" and "speed on" that both match with advertisement texts, e.g., the word "bring" may match with various advertisement texts such as "Colgate, always brings your smile back," etc. while the words "speed on" may match with the advertisement text for "Goodyear tires." At 906, control circuitry 604 analyzes the overlapping portion and the non-overlapping portion in a context of the respective advertisement text, and then determines whether the overlapping portion contains more significant words than the non-overlapping portion in the context of the respective advertisement text at 908. In the above example, control circuitry 604 identifies that the keywords "speed on" matches with more significant words with the respective advertisement text than the keyword "bring," because control circuitry 604 determines that the keywords "speed on" matches with two out of four words of the advertisement text "speed on with Goodyear tires" versus the keyword "bring" only matches with one out of five words of the advertisement text "Colgate, bring your smile back." At 910, when the overlapping portion has more significant words than the non-overlapping portion, process 900 proceeds to 912, where control circuitry 604 assigns a first relevance level to the respective advertisement text. Otherwise, at 910, when the overlapping portion has less significant words than the non-overlapping portion, process 900 proceeds to 914, where control circuitry 604 assigns a second relevance level lower than the first relevance level to the respective advertisement text.

Figure 10:
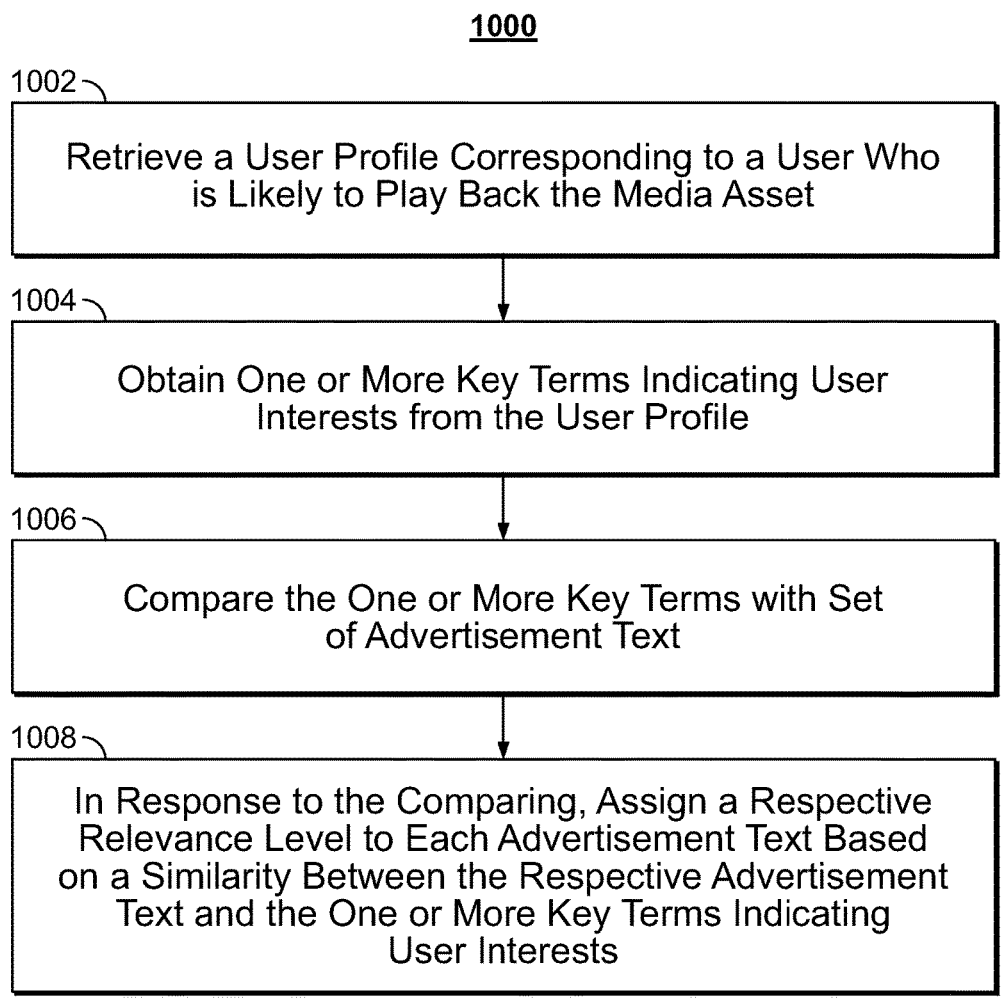
FIG. 10 depicts an illustrative flowchart of a process for ranking a set of advertisement texts from queries corresponding to the one or more keywords based on each relevance level corresponding to each respective advertisement text based on user interests, in accordance with some embodiments of the disclosure.

FIG. 10 depicts an illustrative flowchart of a process for ranking a set of advertisement texts from queries corresponding to the one or more keywords based on each relevance level corresponding to each respective advertisement text (e.g., see 816 in FIG. 8) based on user interests, in accordance with some embodiments of the disclosure. Process 1000 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1000 begins at 1002, where control circuitry 604 retrieves a user profile corresponding to a user who is likely to play back the media asset. For example, control circuitry 604 retrieves a user profile that is registered with household user equipment (e.g., see 106 in FIG. 1) from storage 608 in FIG. 6 or data source 718 via communications network 714 in FIG. 7. At 1004, control circuitry 604 obtains one or more key terms indicating user interests from the user profile. For example, control circuitry 604 reads data tags such as "sports," "cars," "tennis," and/or the like from the user profile under a data section indicating user interests. At 1006, control circuitry 604 compares the one or more key terms with set of advertisement text. At 1008, in response to the comparing, control circuitry 604 assigns a respective relevance level to each advertisement text based on a similarity between the respective advertisement text and the one or more key terms indicating user interests. For example, control circuitry 604 retrieves or identifies a category of the product relating to the advertisement text, e.g., "cars" or "automobiles" relating to the product "Goodyear tires" and then compares the category with the user interests tags. When the category matches with one of the user interests tags, control circuitry 604 assigns a relatively high relevance level to the respective advertisement text.

Figure 11:
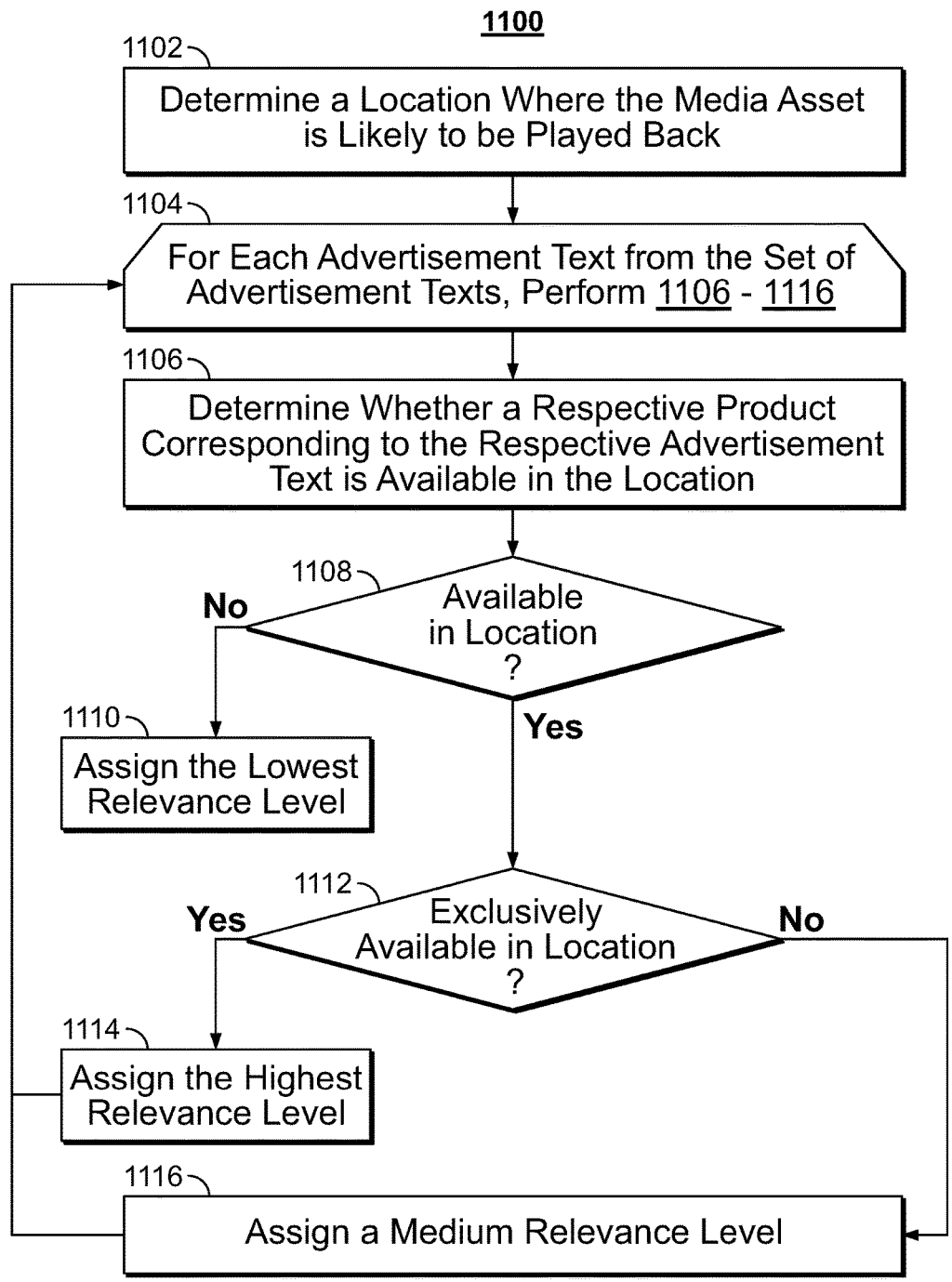
FIG. 11 depicts an illustrative flowchart of a process for ranking a set of advertisement texts from queries corresponding to the one or more keywords based on each relevance level corresponding to each respective advertisement text based on availability of the advertised product in the user location, in accordance with some embodiments of the disclosure.

FIG. 11 depicts an illustrative flowchart of a process for ranking a set of advertisement texts from queries corresponding to the one or more keywords based on each relevance level corresponding to each respective advertisement text (e.g., see 816 in FIG. 8) based on availability of the advertised product in the user location, in accordance with some embodiments of the disclosure. Process 1100 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1100 begins at 1102, where control circuitry 604 determines a location where the media asset is likely to be played back. For example, control circuitry 604 retrieves a user profile from storage 608 in FIG. 6 or data source 718 via communications network 714 in FIG. 7 to identify a registered address associated with user equipment (e.g., 106 in FIG. 1). For another example, control circuitry 604 sends a query to a user device to obtain a location of the user device. At 1104, process 1100 repeats 1106-1116 for each advertisement text from the set of advertisement texts. Specifically, starting at 1106, control circuitry 604 determines whether a respective product corresponding to the respective advertisement text is available in the location. At 1108, when the advertised product is available in the user location, process 1100 proceeds to 1112, where control circuitry 604 determines whether the advertised product is exclusively available in the user location. At 1108, when the advertised product is unavailable in the user location, process 1100 proceeds to 1110, where control circuitry 604 assigns the lowest relevance level to the advertised product and the advertisement text. At 1112, when the advertised product is exclusively available in the user location, control circuitry 604 assigns the highest relevance level to the advertised product and the advertisement text at 1114. At 1112. when the advertised product is exclusively available in the user location, e.g., when the product is also available in other locations, control circuitry 604 assigns a medium relevance level to the advertised product and the advertisement text, at 1116.

Figure 12:
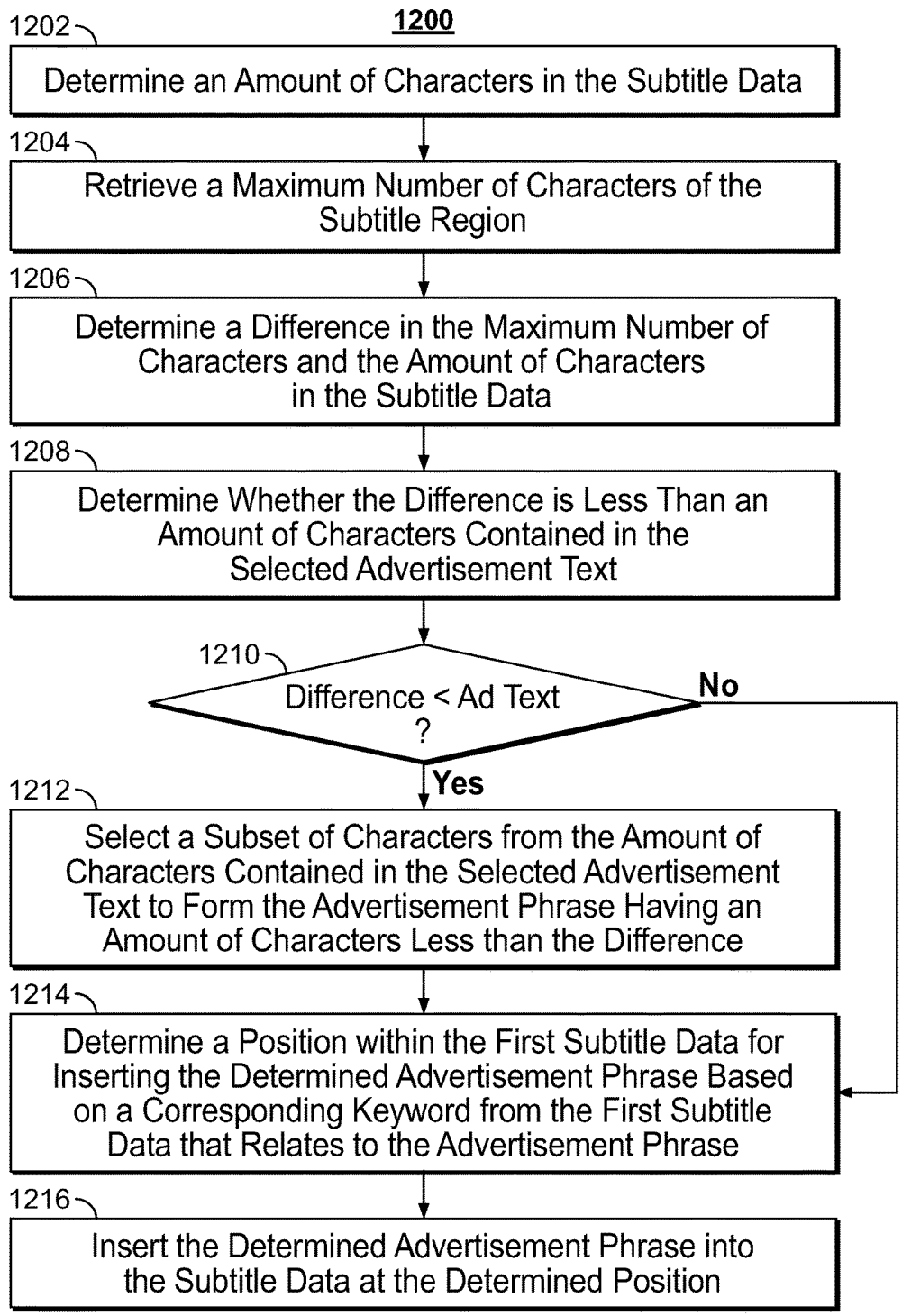
FIG. 12 depicts an illustrative flowchart of a process for generate for display, at the subtitle region of the video frame of the media asset, the subtitle data having the determined advertisement phrase displayed in line with a subtitle line, in accordance with some embodiments of the disclosure.

FIG. 12 depicts an illustrative flowchart of a process for generate for display, at the subtitle region of the video frame of the media asset, the subtitle data having the determined advertisement phrase (e.g., see 822 in FIG. 8) displayed in line with a subtitle line, in accordance with some embodiments of the disclosure. Process 1200 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1200 begins at 1202, where control circuitry 604 determines an amount of characters in the subtitle data. At 1204, control circuitry 604 retrieves a maximum number of characters of the subtitle region. At 1206, control circuitry 604 determines a difference in the maximum number of characters and the amount of characters in the subtitle data. At 1208, control circuitry 604 determines whether the difference is less than an amount of characters contained in the selected advertisement text. At 1210, when the determined difference is less than the advertisement text, indicating there is insufficient space in the subtitle region to display the advertisement text together with the subtitle line, process 1200 proceeds to 1212, where control circuitry 604 selects a subset of characters from the amount of characters contained in the selected advertisement text to form the advertisement phrase having an amount of characters less than the difference. Otherwise, process 1200 proceeds to 1214, where control circuitry 604 determines a position within the first subtitle data for inserting the determined advertisement phrase based on a corresponding keyword from the first subtitle data that relates to the advertisement phrase. For example, control circuitry 604 identifies the keywords in the subtitle line as the portion to insert the advertisement text. At 1216, control circuitry 604 inserts the determined advertisement phrase into the subtitle data at the determined position. For example, control circuitry 604 retrieves the subtitle data file (e.g., 301 in FIG. 3) from the storage 608, and modifies the subtitle data file with the inserted advertisement text to generate an updated subtitle data file (e.g., 302 in FIG. 3). Control circuitry 604 then generates for display the subtitle while the media asset is played according to the updated subtitle data file.

Figure 13:
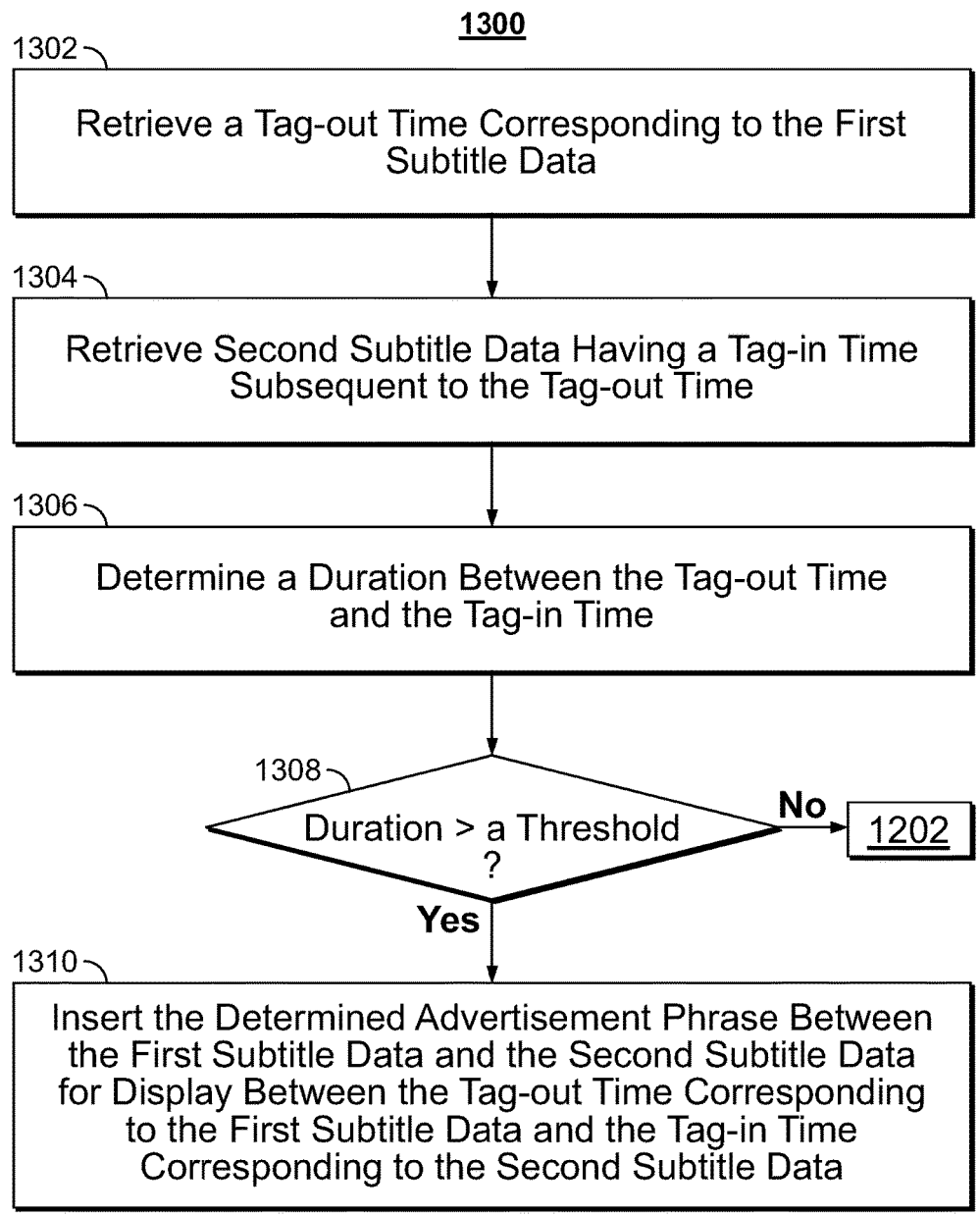
FIG. 13 depicts an illustrative flowchart of a process for generate for display, at the subtitle region of the video frame of the media asset, the subtitle data having the determined advertisement phrase displayed between two consecutive subtitle lines, in accordance with some embodiments of the disclosure.

FIG. 13 depicts an illustrative flowchart of a process for generate for display, at the subtitle region of the video frame of the media asset, the subtitle data having the determined advertisement phrase (e.g., see 822 in FIG. 8) displayed between two consecutive subtitle lines, in accordance with some embodiments of the disclosure. Process 1300 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1300 begins at 1302, where control circuitry 604 retrieves a tag-out time corresponding to the first subtitle data, and then retrieves second subtitle data having a tag-in time subsequent to the tag-out time at 1304. For example, control circuitry 604 retrieves a subtitle data file (e.g., 301 in FIG. 3) from storage 608 in FIG. 6, and then reads the subtitle data entries from the subtitle data file to retrieve the tag-in or tag-out time corresponding to a subtitle entry. At 1306, control circuitry 604 determines a duration between the tag-out time and the tag-in time. At 1308, when the duration is greater than a threshold, control circuitry 604 inserts the determined advertisement phrase between the first subtitle data and the second subtitle data for display between the tag-out time corresponding to the first subtitle data and the tag-in time corresponding to the second subtitle data. For example, control circuitry 604 creates a new subtitle entry with a tag-in time and a tag-out time within the duration between the tag-out time of the first subtitle data and the tag-in time of the second subtitle data, and the new subtitle entry includes a subtitle line corresponding to the advertisement text for display at the subtitle region.

It should be noted that processes 800-1300 or any step thereof could be performed on, or provided by, any of the devices shown in, or described with respect to, FIGS. 1-3 and 6-7. For example, any of processes 800-1300 may be executed by control circuitry 604 (FIG. 6) as instructed by control circuitry implemented on user equipment 106 (FIG. 1), 702, 704, 706 (FIG. 6), and/or the like for generating and displaying a summary view of a media asset. In addition, one or more steps of processes 800-1300 may be incorporated into or combined with one or more steps of any other process or embodiment.

It is contemplated that the actions or descriptions of each of FIGS. 8-13 may be used with any other embodiment of this disclosure. In addition, the actions and descriptions described in relation to FIGS. 8-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-13 could be used to perform one or more of the actions in FIGS. 8-13.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining an advertisement phase based on available display time or space corresponding to the subtitle data at the subtitle region (see 820 in FIG. 8), e.g., by processing circuitry 606 of FIG. 6. The processing circuitry, for instance, may be a general purpose processor, a customized integrated circuit (e.g., an ASIC), or a field-programmable gate array (FPGA) within user equipment 600, media content source 716, or media guidance data source 718. For example, the attributes of media assets, may be stored in, and retrieved from, storage 608 of FIG. 6, or media guidance data source 718 of FIG. 7. Furthermore, processing circuitry, or a computer program, may update configuration data of the media guidance application, which may be stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for inserting an advertisement into a subtitle of a media asset for display as part of the subtitle of the media asset, the method comprising:
   obtaining media guidance data indicating availability of a plurality of media assets;
   determining, based on the media guidance data, a media asset that is likely to be played at a later time;
   obtaining first subtitle data corresponding to the media asset;
   identifying one or more keywords from the first subtitle data;
   for each identified keyword from the first subtitle data:
      transmitting a query based on the respective identified keyword to a product advertisement database storing advertisement information relating to a plurality of products; and
      in response to the transmitted query, obtaining a query result indicating the respective identified keyword matches an advertisement text corresponding a product from the plurality of products;
   ranking a set of advertisement texts from queries corresponding to the one or more keywords based on each relevance level corresponding to each respective advertisement text;
   selecting an advertisement text having a highest relevance level from the set of advertisement;
   determining an advertisement phrase from the selected advertisement text based at least in part on available display time and space corresponding to first subtitle data at a subtitle region within a video frame of the media asset; and generating for display, at the subtitle region of the video frame of the media asset, the first subtitle data having the determined advertisement phrase.

2. The method of claim 1, wherein the identifying one or more keywords from the first subtitle data comprises:
comparing the first subtitle data with a plurality of advertisement texts from the product advertisement database;
determining, from the first subtitle data, that a word or a combination of words from the first subtitle data at least partially matches with an advertisement text from the plurality of advertisement texts; and
identifying the word or the combination of words as one of the one or more keywords.

3. The method of claim 1, wherein the ranking the set of advertisement texts from queries corresponding to the one or more keywords based on each relevance level corresponding to each respective advertisement text comprises:
for each keyword that matches with a respective advertisement text:
determining an overlapping portion between the respective keyword and the respective advertisement text and a non-overlapping portion not included in the respective keyword from the respective advertisement text;
analyzing the overlapping portion and the non-overlapping portion in a context of the respective advertisement text;
in response to determining that the overlapping portion contains more significant words than the non-overlapping portion in the context of the respective advertisement text, assigning a first relevance level to the respective advertisement text; and
in response to determining that the overlapping portion contains less significant words than the non-overlapping portion in the context of the respective advertisement text, assigning a second relevance level lower than the first relevance level to the respective advertisement text.

4. The method of claim 1, wherein the ranking the set of advertisement texts from queries corresponding to the one or more keywords based on each relevance level corresponding to each respective advertisement text comprises:
retrieving a user profile corresponding to a user who is likely to play back the media asset;
obtaining one or more key terms indicating user interests from the user profile;
comparing the one or more key terms with set of advertisement text;
in response to the comparing, assigning a respective relevance level to each advertisement text based on a similarity between the respective advertisement text and the one or more key terms indicating user interests.

5. The method of claim 1, wherein the wherein the ranking the set of advertisement texts based on a relevance level corresponding to each advertisement text comprises:
determining a location where the media asset is likely to be played back;
for each advertisement text from the set of advertisement texts:
in response to determining that a respective product corresponding to the respective advertisement text is exclusively available in the location, assigning a first relevance level to the respective advertisement text;
in response to determining that the respective product corresponding to the respective advertisement text is available across different locations, assigning a second relevance level lower than the first relevance level to the respective advertisement text; and
in response to determining that the respective product corresponding to the respective advertisement text is unavailable in the location, assigning a third relevance level lower than the second relevance level to the respective advertisement text.

6. The method of claim 1, wherein the determining the advertisement phrase from the selected advertisement text based on available display time or space corresponding to first subtitle data at a subtitle region within a video frame of the media asset comprises:
determining a first amount of characters in the first subtitle data;
retrieving a maximum number of characters of the subtitle region;
determining a difference in the maximum number of characters and the first amount of characters;
in response to determining that the difference is less than an amount of characters contained in the selected advertisement text, selecting a subset of characters from the amount of characters contained in the selected advertisement text to form the advertisement phrase having an amount of characters less than the difference;
determining a position within the first subtitle data for inserting the determined advertisement phrase based on a corresponding keyword from the first subtitle data that relates to the advertisement phrase; and
inserting the determined advertisement phrase into the first subtitle data at the determined position.

7. The method of claim 1, wherein the determining the advertisement phrase from the selected advertisement text based on available display time and space corresponding to first subtitle data at the subtitle region within a video frame of the media asset comprises:
retrieving a tag-out time corresponding to the first subtitle data;
retrieving second subtitle data having a tag-in time subsequent to the tag-out time;
determining a duration between the tag-out time and the tag-in time;
in response to determining that the duration is greater than a threshold, inserting the determined advertisement phrase between the first subtitle data and the second subtitle data for display between the tag-out time corresponding to the first subtitle data and the tag-in time corresponding to the second subtitle data.

8. The method of claim 7, further comprising:
generating or retrieving from a local or network storage, an audio file corresponding to the determined advertisement phrase; and
playback the audio file corresponding to the determined advertisement phrase during the duration between the tag-out time and the tag-in time.

9. The method of claim 1, wherein the determining, based on the media guidance data, the media asset that is likely to be played at the later time comprises:
determining, based on a program schedule listing from the media guidance data, the media asset to be aired on a channel that has been displayed; or
determining, based on a listing of available previously stored media assets from the media guidance data, the media asset that has been recently stored.

10. The method of claim 1, wherein the obtaining first subtitle data corresponding to the media asset comprises:
- receiving metadata corresponding to the media asset;
- determining whether subtitle data is available from the metadata;
- in response to determining that subtitle data is unavailable from the metadata:
  - buffering a portion of the received media asset prior to playing back the portion;
  - performing speech-to-text recognition on the buffered portion of the received media asset to generate the first subtitle data; and
  - generating for display, at the subtitle region of the video frame of the buffered portion of media asset, the first subtitle data having the determined advertisement phrase while displaying the buffered portion.

11. A system for inserting an advertisement into a subtitle of a media asset for display as part of the subtitle of the media asset, the system comprising:
- memory; and
- processing circuitry configured to:
  - obtain media guidance data indicating availability of a plurality of media assets;
  - determine, based on the media guidance data, a media asset that is likely to be played at a later time;
  - obtain, from the memory, first subtitle data corresponding to the media asset;
  - identify one or more keywords from the first subtitle data;
  - for each identified keyword from the first subtitle data:
    - transmit a query based on the respective identified keyword to a product advertisement database storing advertisement information relating to a plurality of products; and
    - in response to the transmitted query, obtain a query result indicating the respective identified keyword matches an advertisement text corresponding a product from the plurality of products;
  - rank a set of advertisement texts from queries corresponding to the one or more keywords based on each relevance level corresponding to each respective advertisement text;
  - select an advertisement text having a highest relevance level from the set of advertisement;
  - determine an advertisement phrase from the selected advertisement text based at least in part on available display time and space corresponding to first subtitle data at a subtitle region within a video frame of the media asset; and
  - generate for display, at the subtitle region of the video frame of the media asset, the first subtitle data having the determined advertisement phrase.

12. The system of claim 11, wherein the processing circuitry is further configured, when identifying one or more keywords from the first subtitle data, to:
- compare the first subtitle data with a plurality of advertisement texts from the product advertisement database;
- determine, from the first subtitle data, that a word or a combination of words from the first subtitle data at least partially matches with an advertisement text from the plurality of advertisement texts; and
- identify the word or the combination of words as one of the one or more keywords.

13. The system of claim 11, wherein the processing circuitry is further configured, when ranking the set of advertisement texts from queries corresponding to the one or more keywords based on each relevance level corresponding to each respective advertisement text, to:
- for each keyword that matches with a respective advertisement text:
  - determine an overlapping portion between the respective keyword and the respective advertisement text and a non-overlapping portion not included in the respective keyword from the respective advertisement text;
  - analyze the overlapping portion and the non-overlapping portion in a context of the respective advertisement text;
  - in response to determining that the overlapping portion contains more significant words than the non-overlapping portion in the context of the respective advertisement text, assign a first relevance level to the respective advertisement text; and
  - in response to determining that the overlapping portion contains less significant words than the non-overlapping portion in the context of the respective advertisement text, assign a second relevance level lower than the first relevance level to the respective advertisement text.

14. The system of claim 11, wherein the processing circuitry is further configured, when ranking the set of advertisement texts from queries corresponding to the one or more keywords based on each relevance level corresponding to each respective advertisement text, to:
- retrieve a user profile corresponding to a user who is likely to play back the media asset;
- obtain one or more key terms indicating user interests from the user profile;
- compare the one or more key terms with set of advertisement text;
- in response to the comparing, assign a respective relevance level to each advertisement text based on a similarity between the respective advertisement text and the one or more key terms indicating user interests.

15. The system of claim 11, wherein the processing circuitry is further configured, when ranking the set of advertisement texts based on a relevance level corresponding to each advertisement text, to:
- determine a location where the media asset is likely to be played back;
- for each advertisement text from the set of advertisement texts:
  - in response to determining that a respective product corresponding to the respective advertisement text is exclusively available in the location, assign a first relevance level to the respective advertisement text;
  - in response to determining that the respective product corresponding to the respective advertisement text is available across different locations, assign a second relevance level lower than the first relevance level to the respective advertisement text; and
  - in response to determining that the respective product corresponding to the respective advertisement text is unavailable in the location, assign a third relevance level lower than the second relevance level to the respective advertisement text.

16. The system of claim 11, wherein the processing circuitry is further configured, when determining the advertisement phrase from the selected advertisement text based on available display time or space corresponding to first subtitle data at a subtitle region within a video frame of the media asset, to:

determine a first amount of characters in the first subtitle data;

retrieve a maximum number of characters of the subtitle region;

determine a difference in the maximum number of characters and the first amount of characters;

in response to determining that the difference is less than an amount of characters contained in the selected advertisement text, select a subset of characters from the amount of characters contained in the selected advertisement text to form the advertisement phrase having an amount of characters less than the difference;

determine a position within the first subtitle data for inserting the determined advertisement phrase based on a corresponding keyword from the first subtitle data that relates to the advertisement phrase; and insert the determined advertisement phrase into the first subtitle data at the determined position.

17. The system of claim 11, wherein the processing circuitry is further configured, when determining the advertisement phrase from the selected advertisement text based on available display time and space corresponding to first subtitle data at the subtitle region within a video frame of the media asset, to:

retrieve a tag-out time corresponding to the first subtitle data;

retrieve second subtitle data having a tag-in time subsequent to the tag-out time;

determine a duration between the tag-out time and the tag-in time;

in response to determining that the duration is greater than a threshold, insert the determined advertisement phrase between the first subtitle data and the second subtitle data for display between the tag-out time corresponding to the first subtitle data and the tag-in time corresponding to the second subtitle data.

18. The system of claim 11, wherein the processing circuitry is further configured to:

generate or retrieving from a local or network storage, an audio file corresponding to the determined advertisement phrase; and playback the audio file corresponding to the determined advertisement phrase during the duration between the tag-out time and the tag-in time.

19. The system of claim 11, wherein the processing circuitry is further configured, when determining, based on the media guidance data, the media asset that is likely to be played at the later time, to:

determine, based on a program schedule listing from the media guidance data, the media asset to be aired on a channel that has been displayed; or determine, based on a listing of available previously stored media assets from the media guidance data, the media asset that has been recently stored.

20. The system of claim 11, wherein the processing circuitry is further configured, when obtaining first subtitle data corresponding to the media asset, to:

receive metadata corresponding to the media asset;

determine whether subtitle data is available from the metadata;

in response to determining that subtitle data is unavailable from the metadata:

buffer a portion of the received media asset prior to playing back the portion;

perform speech-to-text recognition on the buffered portion of the received media asset to generate the first subtitle data; and generate for display, at the subtitle region of the video frame of the buffered portion of media asset, the first subtitle data having the determined advertisement phrase while displaying the buffered portion.

* * * * *